US006950453B2

(12) United States Patent
Biswas et al.

(10) Patent No.: US 6,950,453 B2
(45) Date of Patent: Sep. 27, 2005

(54) PULSER DRIVEN, HELIUM FREE TRANSVERSELY EXCITED ATMOSPHERIC-PRESSURE (TEA) $CO_2$ LASER

(75) Inventors: Dhruba J. Biswas, Mumbai (IN); Jonnaiagadda Padma Nilaya, Mumbai (IN); Aniruddha Kumar, Thane (IN)

(73) Assignee: Secretary, Department of Atomic Energy Goverment of India (IN)

( * ) Notice: Subject to any disclaimer, the term of this patent is extended or adjusted under 35 U.S.C. 154(b) by 77 days.

(21) Appl. No.: 10/612,848

(22) Filed: Jul. 3, 2003

(65) Prior Publication Data

US 2005/0002432 A1 Jan. 6, 2005

(51) Int. Cl.[7] .............................. H01S 3/22; H01S 3/09; H01S 3/097
(52) U.S. Cl. .............................. 372/82; 372/86; 372/90; 372/55
(58) Field of Search .............................. 372/55, 57, 58, 372/59, 82, 83, 86, 87, 90

(56) References Cited

U.S. PATENT DOCUMENTS

| | | | | | |
|---|---|---|---|---|---|
| 4,264,868 | A | * | 4/1981 | Leland et al. | 359/342 |
| 4,365,337 | A | * | 12/1982 | Cirkel et al. | 372/82 |
| 4,802,185 | A | * | 1/1989 | Kyusho | 372/86 |
| 4,847,853 | A | * | 7/1989 | Altman | 372/86 |
| 5,271,026 | A | * | 12/1993 | Kosugi et al. | 372/38.1 |
| 5,293,390 | A | * | 3/1994 | Furuya et al. | 372/86 |
| 5,309,462 | A | * | 5/1994 | Taylor et al. | 372/38.03 |
| 6,546,036 | B1 | * | 4/2003 | Bragin et al. | 372/57 |

OTHER PUBLICATIONS

P.E. Dyer and B.L. Tait, Improved Performance of Mini–repetitively Pulsed CO2 Lasers Using H2 Buffered Gas Mixtures, Appl. Phy. Lett., 41(6):506–508 (1982).

P.E. Dyer and B.L. Tait, Miniature 250 Hz, TEA CO2 Laser Using H2 Buffered Gas Mixture, J. Phys. E: Sci. Instrum., 16:467–469 (1983).

M. Trtica et al., Short Delay Time UV Preionized TEA CO2 Laser Operating with Binary CO2/H2 and CO2/He Gas Mixtures, Opt. Quant. Electron., 16:511–516 (1984).

D.J. Biswas and J. Padma Nilaya, Repetitive Transversely Excited Gas Laser Pulsers, Prog. Quant. Electron. 26:1–63 (2002).

G.J. Ernst, Uniform–Field Electrodes with Minimum Width, Opt. Commun. 49:275–277 (1984).

A. Kumar et al., A Novel Method of Measuring the Delay Between Pre–Ionizing and Main Discharges in TE Gas Lasers, Meas. Sci. Technol. 12:1739–1742 (2001).

* cited by examiner

*Primary Examiner*—Minsun Oh Harvey
*Assistant Examiner*—Armando Rodriguez
(74) *Attorney, Agent, or Firm*—Pendorf & Cutliff (57) ABSTRACT

A novel and inexpensive excitation circuit based on a single switch and a single source drives helium-free TEA $CO_2$ lasers, mini to conventional types, providing low divergent output. By varying the partial pressure of either $CO_2$ or $N_2$, the duration (FWHM) and the peak power of the laser pulse (for a system with active volume about 70 cc) is made to vary by a factor of about 7 and about 5 respectively. The fact that expensive and scarce helium is not a constituent of the laser gas mixture makes it an ideal system for high repetition rate operation as the gas re-circulatory loop consisting of the heat exchanger and the catalytic re-converter, a mandatory requirement for conventional systems to recycle helium gas, can be readily dispensed with here. This laser can be used wherever a TEA $CO_2$ laser with conventional gas mixture containing helium is used.

11 Claims, 6 Drawing Sheets

PULSER DRIVEN, HELIUM FREE TRANSVERSELY EXCITED ATMOSPHERIC-PRESSURE (TEA) $CO_2$ LASER

FIELD OF INVENTION

The present invention relates to a pulser driven, helium-free transversely excited atmospheric-pressure (TEA) $CO_2$ laser. The invention has potential applications in areas such as material processing (e.g. engraving, marking etc), isotope separation, scientific research, laser spectroscopy, medical research, and the like.

BACKGROUND AND PRIOR ART

Helium plays a major role in the pulsed atmospheric pressure operation of a transversely excited $CO_2$ laser, commonly termed as TEA $CO_2$ laser, mainly in stabilising the discharge of the laser. Helium, with its very low electron affinity, facilitates the occurrence of an arc free discharge at atmospheric pressure and hence has been indispensable in the conventional operation of TEA $CO_2$ lasers. However, helium is an expensive and scarce gas and the use of helium in TEA lasers substantially increases the production as well as operational cost of such lasers. Several attempts have been made and number of special techniques have been employed in the past to obtain helium free operation of $CO_2$ lasers.

Such methods and their limitations are briefly described below

1. Low pressure $CO_2$ laser: There exist many reports on helium free low pressure TE $CO_2$ lasers or helium free CW operation of low pressure $CO_2$ lasers. In these systems the low operating pressure intrinsically ensures glow mode operation of the discharge in absence of helium.

By virtue of their low pressure operation, although they can be operated in CW mode, the maximum coherent power that can be obtained from such systems is at least three orders of magnitude lower than the TEA systems.

2. Rapid discharge technique: This approach takes advantage of a very rapid discharge (few tens of nsec as against hundreds of nsec in a conventional operation) to realise helium free operation, as the glow to arc transition in absence of helium is very fast [P. E. Dyer and B. L. Tait, Appl Phys Lett 41, 506 (1982)., P. E. Dyer and B. L. Tait, J. Phys E:Sci Instrum 16, 467 (1983)., M. Trtica, P. Vujkcvic Cvijin, and I. Mendas, Opt Quant Electron 16, 511 (1984)]. Thus discharge extinguishes before arcing can set in.

Helium free operation by rapid discharge technique can be effected only in specially designed mini laser systems that inherently offer low discharge loop inductance. Such operation, therefore, restricts the active volume and hence the maximum obtainable energy output from the system. Rapid excitation invariably results in the emission of optical pulses with short duration and high peak power. Conventional long pulse operation is therefore not possible by this method.

3. Seeding the laser gas mixture with Low Ionisation Potential (LIP) additives: In the absence of helium the electrons in the discharge are lost largely by negative ion attachment processes giving rise to the formation of an arc discharge. The addition of LIP hydrocarbons increases the primary photoelectron density thereby compensating the loss of electrons in absence of helium leading to arc free operation [S. Marchetti, R. Simili, and M. Giorgi, J. de Physique 48, C7–51 (1987)].

The LIP additives seeded in the laser gas mixture undergo dissociation in an electric discharge, which tend to settle on the optics, electrodes, and the internal surface of the laser head degrading rapidly the performance of the laser.

4. Preconditioning the inter-electrode volume by electrons from an external source: Loss of electrons in absence of helium can be overcome by deluging the active volume with electrons produced externally, as in case of an electron beam controlled $CO_2$ laser, resulting in arc free operation [U.S. Pat. No. 4,264,868]. The US patent referred to describes a high power output $CO_2$ gas laser amplifier having a number of sections, each comprising a plurality of annular pumping chambers spaced about the circumference of a vacuum chamber containing a cold cathode, gridded electron gun. The electron beam from the electron gun ionizes the gas lasing medium in the sections. An input laser beam is split into a plurality of annular beams, each passing through the sections comprising one pumping chamber. In this system thus, helium-free operation of TEA $CO_2$ lasers calls for an external source of electrons thereby making the system more complicated, expensive and bulky. In addition, this is achieved at the expense of the wall plug efficiency. U.S. Pat. No. 4,264,868 relates to the generation of hundreds of kJ of focusable energy contained in a pulse of duration of 1 nsec or less. The discharge stability at 1800 torr was obtained by making use of an externally generated electron beam that provided the required ionisation in a laser mixture consisting of the molecular gases alone. As stated in this US patent itself, this system is meant for a specific application. Conventional operation based on this method not only makes the system bulky but also less efficient.

OBJECT OF THE INVENTION

Therefore the main object of the present invention is to provide a helium free TEA $CO_2$ laser which is compact-and has electro-optical efficiency comparable to that of conventional TEA $CO_2$ laser.

Another object of the present invention is to provide a helium free TEA $CO_2$ laser which comprises a simple and inexpensive excitation circuit.

A further object of the present invention is to provide a helium free TEA $CO_2$ laser which is devoid of the drawbacks of prior art.

Yet further object of the present invention is to provide a helium free TEA $CO_2$ laser having easy control on the temporal width (Full Width Half Maximum, i.e. FWHM) and the peak power of the laser emission.

Yet another object of the invention is to manufacture the repetitive TEA $CO_2$ laser at a lower cost in addition to reducing its operational cost.

SUMMARY OF THE INVENTION

Accordingly the present invention provides a helium free TEA $CO_2$ laser comprising a pulser, a laser head comprising a pair of electrodes, a gaseous medium of a mixture of $CO_2$, $N_2$ and optionally $H_2$ adapted to be pre-conditioned/pre-ionised in the inter-electrode volume by suitable means; said pulser comprising an excitation circuit comprising (i) means to isolate spiker and sustainer pulses and (ii) means to delay the spiker pulse with respect to the pre-ionising pulse.

The excitation circuit operates with a single switch and a single high voltage d-c source.

The laser of the present invention also comprises means to vary the peak power, duration and energy of the laser pulse.

DETAILED DESCRIPTION OF THE PRESENT INVENTION

The laser in accordance with the present invention has a pair of electrodes housed in the laser head having a geometry selected from planar, cylindrical, or profiled types that are normally used for the construction of a TEA $CO_2$ laser head. [The different electrode geometries have been enumerated in "D. J. Biswas and J. Padma Nilaya, 'Repetitive TE gas laser pulsers', Prog Quant Electron 26, pp 1–63(2002)"]. In case of unprofiled electrodes with rounded off edges, one of the electrodes can be semi-transparent with uniformly drilled holes of appropriate size in the planar region of the electrode to facilitate preionisation of the inter-electrode volume. The inter-electrode volume ranges from about 1 $cm^3$ to about 200 $cm^3$.

The means to pre-condition/pre-ionise comprises a parallel spark type mechanism with the preionising sparks distributed i) along the length of the electrodes on one or both sides (for cylindrical electrode geometry) or ii) along the length of the electrodes on both sides (for profiled geometry) or iii) along the length underneath the semi-transparent electrode if one of the electrodes—is semi-transparent (for planar geometry).

The means to isolate the spiker and the sustainer pulses and the means to delay the spiker pulse with respect to the preioniser pulse is a wire wound inductance connected between the ground and the corresponding electrode. Thus a coupling of two discharge loops is done with the wire wound inductance the range of value of which depends on the size of the laser.

The high voltage source of the excitation circuit is selected from a rectified, filtered, D-C source and a voltage doubler capable of providing the required voltage and current which varies from system to system.

The laser cavity can be dispersive or non dispersive. The means to vary peak power, duration and energy of the laser pulse comprises means to vary the partial pressure of $CO_2$ from 10% to 90% of the total pressure. Glow discharge and lasing can be obtained for the gas composition ranging from $CO_2$:$N_2$::10:1 to $CO_2$:$N_2$::0.4:1. Thus a large variation of peak power, duration and energy of the laser pulse is achieved by simple control of the partial pressure. Variation of partial pressure is carried out by any suitable conventional means such as controlling flow of gases by needle valves.

BRIEF DESCRIPTION OF THE DRAWINGS

The preferred embodiments of the invention are described with reference to figures in the accompanying drawings, in which.

The examples are by way of illustration only and in no way restrict the scope of invention.

Embodiment 1: This embodiment of the present invention utilises spatially contoured electrodes viz., Ernst profile [G. J. Ernst, Opt Commun 49, 275 (1984)] electrodes defining an inter-electrode volume of about 70 cc.

Figure 1:
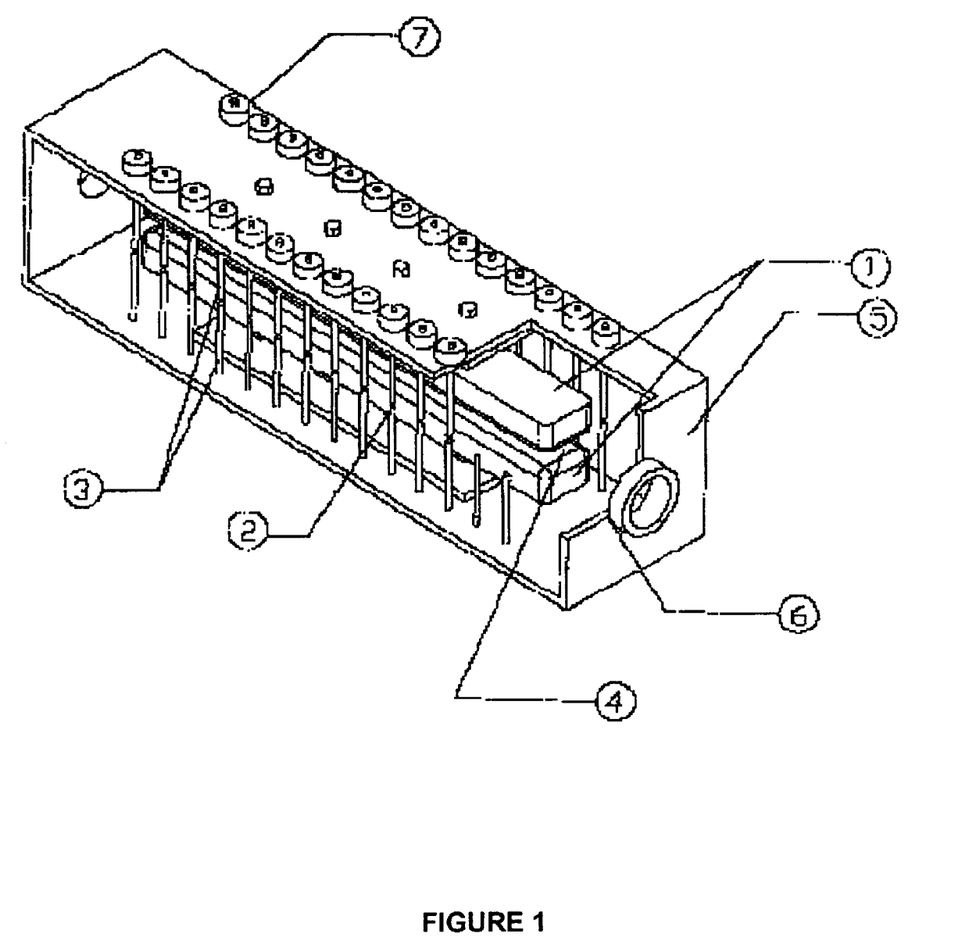
FIG. 1 shows a three dimensional view of the laser head.

A 3-dimensional view of the laser head is shown in FIG. 1. The laser head consists of two Ernst profiled [1] electrodes which define a discharge cross section of 1.5×1.5 $cm^2$ and a length of 30 cm. Preconditioning of the laser gas mixture is accomplished by creating auxiliary spark discharges [2] between brass preionising pins [3] (14 pairs on either side) placed at regular interval along the length of the discharge and at a distance of 5 cm from its centre[4]. The entire assembly is housed in a leak tight Perspex chamber [5] (36 cm×12 cm×15 cm) the ends [6] of which are 'O'ring sealed with a concave 4 m ROC gold coated mirror and a ZnSe Brewster window. A 70% reflective ZnSe plane output mirror together with the gold coated mirror defines the 65 cm long optical cavity. The flow of current through each of the auxiliary sparks [2] is limited by connecting a small capacitance [7] in series with it.

Figure 2:
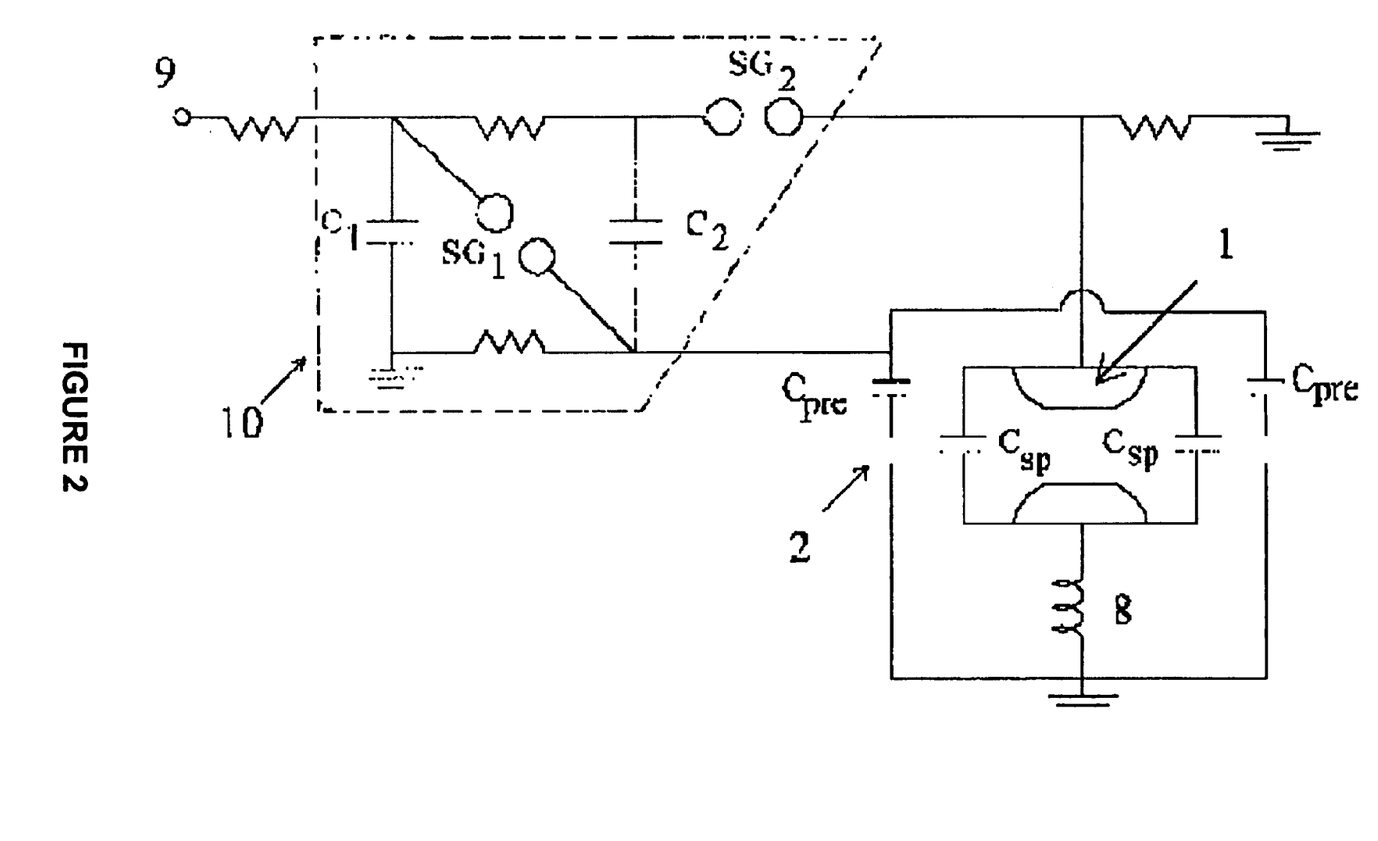
FIG. 2 shows a schematic of the excitation circuit for helium free operation of a TEA $CO_2$ laser.
Figure 3:
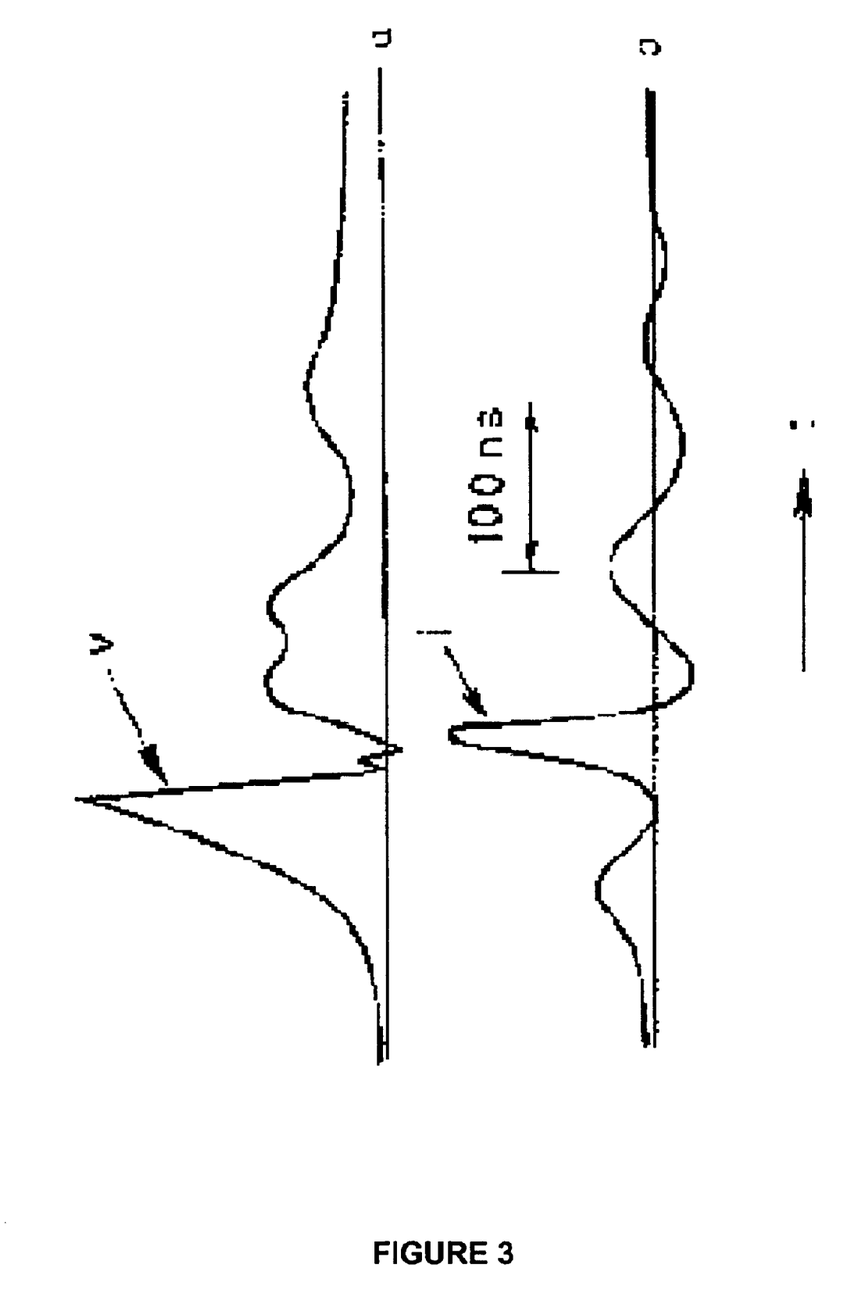
FIG. 3 shows a graph illustrating the variation of voltage across the main discharge (FIG. 3(a)) and that of current in the sustainer loop (FIG. 3(b)).

The schematic of the excitation technique employed to operate the TEA $CO_2$ laser wherein the spiker and sustainer like actions have been integrated into a single pulser network with the help of a coupling inductance [8] is shown in FIG. 2. Such an integration has made possible a single high voltage d-c source [9] to power and a single switch [$SG_1$] driven pulser to control all the three discharges viz., the pre, the spiker, and the sustainer discharges as against the conventional spiker sustainer excitation scheme requiring two sources and two switches to achieve the same. The usage of a two stage Marx generator [10] allows the condenser $C_1$, on closure of switch $8G_1$, to power the pre discharge. Alongside the preionisation, on closure of $SG_2$, the main condensers $C_1$ and $C_2$ come in series and charge transfer through the inductance [8] causes the voltage across the spiker condenser $C_{sp}$ to build up rapidly as shown in FIG. 3(a). FIG. 3(b) represents the current flowing from the main condensers following the closure of the spark gap $SG_2$. The first forward cycle of the current pulse charges up the spiker condenser $C_{sp}$ to its peak voltage. As this high voltage impulse is impressed across the inter electrode gap, it closes leading to the flow of the spiker current. This arrangement automatically delays the main discharge with respect to the pre discharge. The small delay can be readily measured from the temporal wave-forms of FIG. 3 and has also been corroborated by adopting the delay measuring method of Kumar et al [A. Kuniar, R. B. Bhatt, D. J. Biswas, N. S. Banerjee, A. Mokhriwale, and U. Nundy, Meas Sci Technol 12, 1739 (2001)] based on the collection of light originating from the preioniser and main discharges separately. The initial voltage to which the main condensers are charged and the values of $C_1$, $C_2$, $C_{pre}$ and $C_{sp}$ are so chosen that after the switching of the Marx Bank, the voltage across the preionised inter-electrode gap results in an E/N appropriate for the initiation of the discharge. The reduced voltage across the main condenser, by virtue of its powering the preioniser discharge and spiker discharges, in conjunction with the inductance [8] maintains an E/N condition suitable for the sustenance of the discharge. Decoupling of the two discharges viz., the spiker and the sustainer and the tailoring of the sustainer pulse by making use of the inductance [8] resulted in a condition where glow discharge could be reliably obtained even in the absence of helium under wide range of operating conditions. The inductance [8] plays a very crucial role as it controls the delay between both pre and spiker and spiker and sustainer discharges in addition to deciding the rate of rise of voltage across the electrodes.

Thus, in this embodiment of the present invention the means to isolate the spiker and the sustainer pulses, and the means to delay the spiker and the sustainer pulses with respect to the preionising pulse comprises a wire wound inductance connected between one of the electrodes and the ground.

Figure 4:
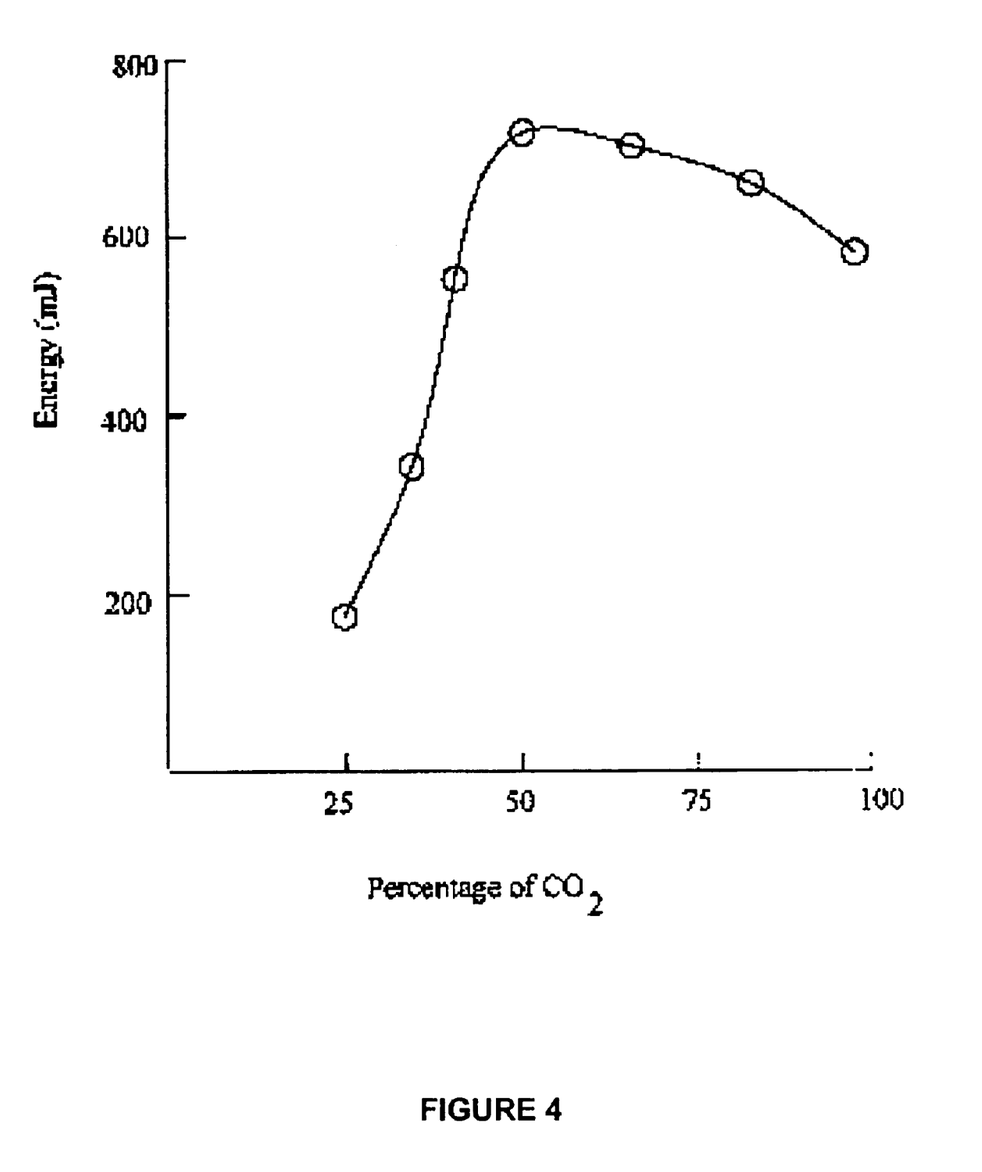
FIG. 4 shows a graph illustrating the variation of the output energy of the laser as a function of pressure of $CO_2$ gas.

The energy, peak power, and the FWHM value of the emitted laser pulse were monitored as a function of the partial pressure of $CO_2$ gas for a particular value of inductance [8]. The results of these studies are illustrated in the form of graphs in FIGS. 4 and 5. Referring to FIG. 4 it is clear from the graph that the most optimised performance of the laser in terms of its output energy occurs for equal concentration of $CO_2$ and $N_2$. The electro-optic efficiency is estimated to be about 7% after accounting for the residual energy in the condenser at the end of the discharge (see FIG. 3(a)). This value would be even higher if the fraction of the stored energy expended in the preconditioning is also considered. The electro-optic efficiency when the same laser operates with conventional gas mixture ($N_2:CO_2:He::1:1:5$) is measured to be 7.8% for multi mode operation. Besides contributing to the stabilisation of the discharge, helium also helps in depopulating the lower laser level allowing thereby the participation of the same $CO_2$ molecule in the lasing process more than once. Although this process is slowed down in the absence of helium, the marginal reduction in the electro optic efficiency here is due to the large concentration of $CO_2$ molecules (50%) in the gas mixture. With the addition of small amount of hydrogen to the gas mixture ($N_2:CO_2:H_2::1:1.2:0.1$) the multimode efficiency increases to about 8.8%. Thus helium free operation has been achieved, although with the addition of some amount of hydrogen, with no reduction in the multi mode operating efficiency of the laser. It should be noted that in the $TEM_{oo}$ mode operation, however, the efficiency of helium free operation always exceeds that obtained with conventional gas mixture. This is due to the fact that in presence of helium, width of the glow discharge is more [P. E. Dyer and B. L. Tait, Appl Phys Lett 41, 506 (1982) and hence $TEM_{oo}$ mode filling is better in the absence of helium. The efficiency of the laser in $TEM_{00}$ mode operation with conventional gas mixture was about 4.3% while it was about 5.2% in case of the present embodiment.

Figure 5:
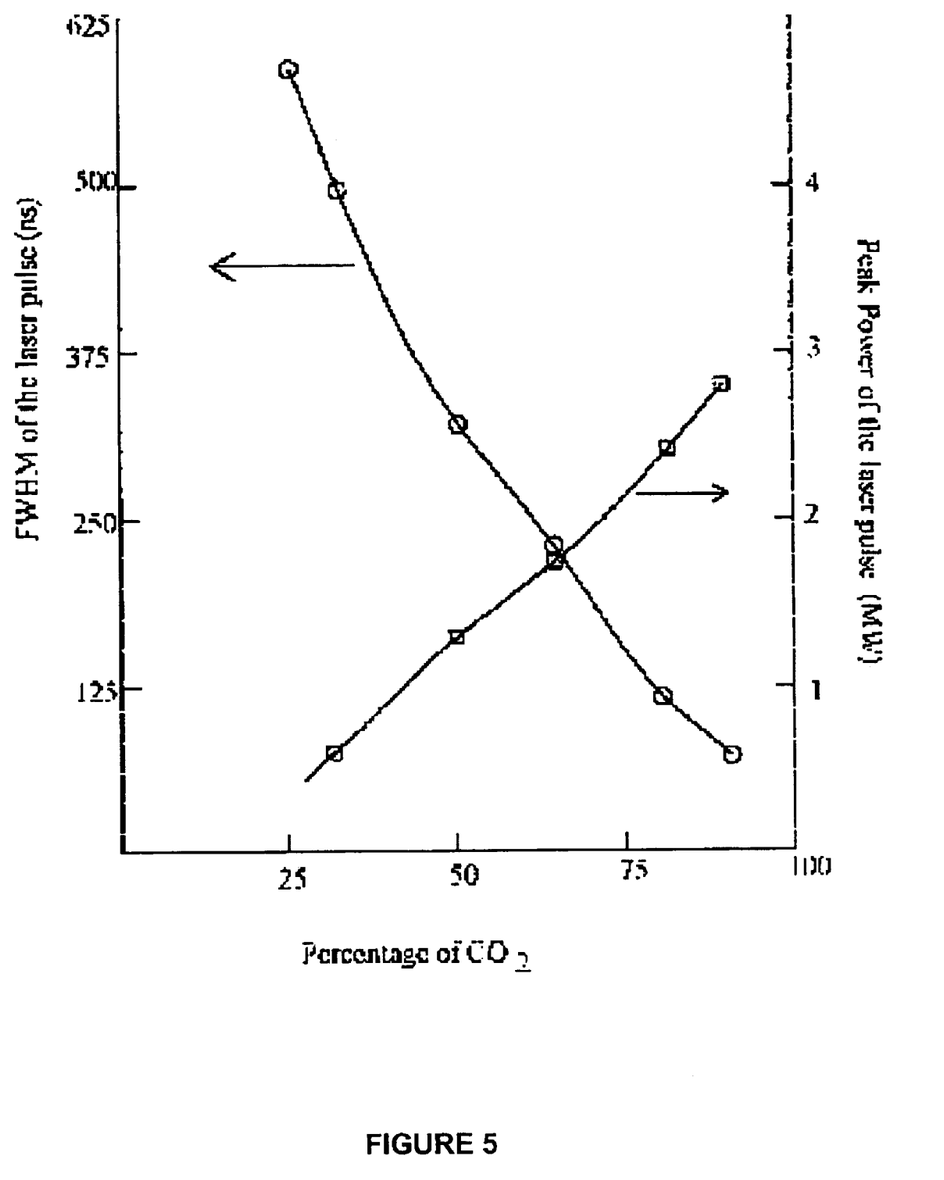
FIG. 5 shows graph illustrating the variation of peak power and the temporal width of the laser pulse as a function of the partial pressure of $CO_2$ gas.
Figure 6:
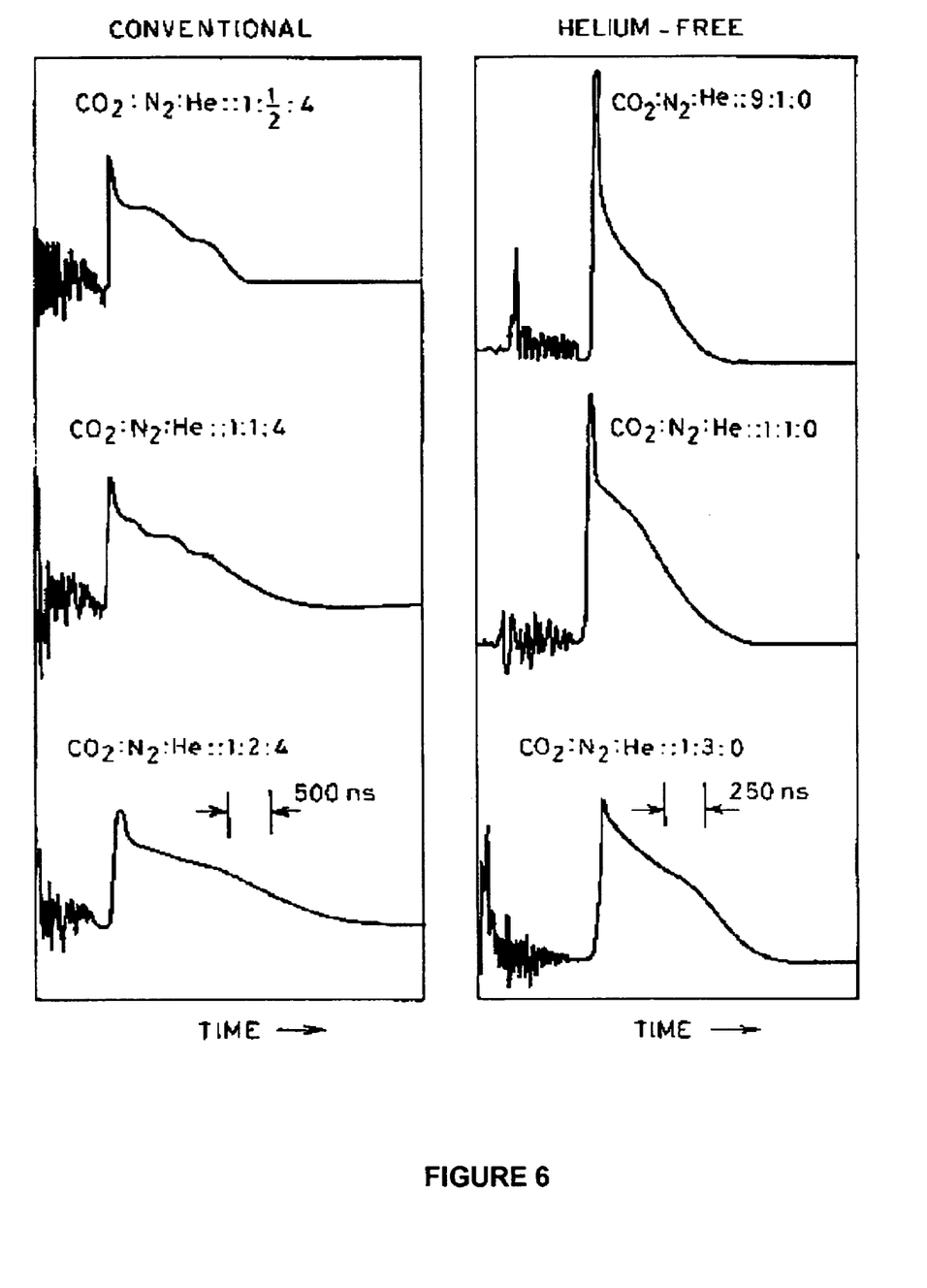
FIG. 6 shows the temporal shape of the laser pulse for conventional and helium free operations as a function of the gas composition.

The peak power, duration and energy of the laser pulse can be varied by varying the partial pressures of $N_2$ and $CO_2$ as shown in the graph of FIG. 5. As the concentration of $CO_2$ reduces from 92% to 27%, the FWHM value of the laser pulse increases (from 80 nsec to 590 nsec) by a factor of about 7.5 while the peak power drops (from 2.84 MW to 0.54 MW) by almost a factor of about 5.25. The peak power increases monotonically with increase in $CO_2$ concentration revealing higher gain at higher density of active molecules. The FWHM value of the optical pulse, on the other hand, increases with reduction in the concentration of $CO_2$. This is due to the fact that $N_2$ can hold vibrational energy for longer duration and any increase in its concentration thus leads to the flattening of the pulse. Such large variation of the peak power and pulse width is a direct consequence of utilizing only molecular gases for the operation of this laser. The same laser when operated with the conventional gas mixture (consisting of helium) exhibits much smaller variation in the pulse duration with changing partial pressures of the molecular gases. Referring to FIG. 6, it is seen that the FWHM value of the laser pulse when the present system is operated with conventional gas mixture changes almost by a factor of about 1.6 (from 800 ns to 1350 ns). It is also seen from FIG. 6 that the maximum peak power obtainable in this case is in general lower than that obtainable with helium free operation. The maximum value of small signal gain for this system has been measured to be about 2.7%/cm. The optimum value of the inductance [8] depends on the partial pressure of $CO_2$ in the gas mixture and ranges from 0.5 to 6.5 $\mu H$ for different $CO_2$ concentrations.

Embodiment 2: This embodiment of the present invention has an active volume about 2.5 cc and demonstrates the helium free operation of a mini TEA $CO_2$ laser. The laser head comprises a pair of cylindrical electrodes defining a discharge of cross section 11 mm×3 mm and a length of 80 mm. Preconditioning of the laser gas mixture was accomplished by creating auxiliary spark discharges between five pairs of copper pins placed at regular interval along the length of the discharge on one side at a distance of about 4 cm from its center. The entire assembly was housed in a leak tight Perspex chamber (14.5×13×5.5 $cm^3$) the ends of which were 'O' ring sealed with a concave 1 m ROC gold coated mirror and a 90% reflective ZnSe output mirror which also formed the optical cavity of length 16.5 cm.

The laser was energized by a spiker sustainer excitation circuit qualitatively similar to that described in the example 1, the only difference being that in place of a two stage marx bank, a single capacitor of 2.25 nF charged to 34 kV served as the main energy storage capacitance. The values of the spiker and the preionising capacitors were respectively 200 pF and 7×100 nF. The optimum value of the coupling inductance [8] is a function of the partial pressure of $CO_2$ and could be varied from 8 $\mu H$ to 46 $\mu H$ for different $CO_2$ concentrations in the gas mixture.

When the laser was operated with molecular gases alone, the energy, the peak power, and the FWHM value of the laser pulse exhibited qualitatively similar behaviour as a function of the partial pressure of $CO_2$ gas. The electro-optic efficiency was estimated to be about 6.7%.

The repetitive operation of a TEA $CO_2$ laser requires the gas in the inter electrode region be replenished at least twice between two pulses. In the operation with conventional gas mixture, this gas, which moves out of the discharge zone is rich in helium and, therefore, is reused by flowing it through a re-circulatory loop containing a heat exchanger for the removal of heat and a catalytic re-converter for the recombination of the dissociated discharge products. As the laser here operates with inexpensive molecular gases alone, the repetitive operation can be realized by simply throwing out the hot and contaminated gas from the discharge zone. The need of an expensive and bulky gas re-circulation loop can therefore be dispensed with. We have successfully operated this mini TEA $CO_2$ laser at a repetition rate of 20 Hz by simply flowing the molecular gases through the inter-electrode region. With the maximum rate at which the gases could be thrown out of the inter-electrode volume, operation up to 13 Hz repetition rate was possible without any reduction in the operating efficiency of the laser. At 20 Hz repetiton rate there was a 10% reduction in its efficiency. The maximum repetition rate achievable here was limited by the rate at which the gas could be flown out of the inter-electrode region.

Advantages of the Present Invention
No Helium Gas

Operation of mini (about 1 $cm^3$ active volume) as well as conventional (up to about 200 $cm^3$ active volume) TEA $CO_2$ lasers can be achieved without the need of expensive and scarce helium gas. The said operation is achievable by the use of a very simple and inexpensive excitation circuit. The preconditioning, the initiation, and the sustenance of the discharge are all powered by a single source and controlled by a single switch.

Electro-Optic Efficiency of the Laser

The electro-optic efficiency of the laser in the $TEM_{oo}$ mode operation exceeds that obtained in the case with the conventional gas mixture.

Temporal Width (FWHM)

The temporal width (FWHM) of the laser pulse can be changed by a factor of about 7.5 (from 80 nsec to 590 nsec) by varying the concentration of $CO_2$ gas alone.

Variation in the temporal width of the emitted pulse over such a range is not possible by varying the gas composition alone in the conventional operation of a TEA $CO_2$ laser.

Peak Power

The peak power can be changed by a factor of about 5 (from 2.84 MW to 0.54 MW) by simply varying the concentration of $CO_2$ gas. The maximum peak power obtainable from a given volume is higher in this case as compared to operation with conventional gas mixture.

Gas Re-Circulatory Loop

As the inexpensive molecular gases viz., $CO_2$ & $N_2$ can be thrown out of the discharge volume, the repetitive operation (25 Hz) of a TEA $CO_2$ laser based on this method has been realised without employing the service of an expensive and bulky gas re-circulatory loop otherwise mandatory for the repetitive operation of TEA $CO_2$ lasers.

Low Operational Cost of a TEA $CO_2$ Laser:

As the most expensive constituent of the gas mixture viz., helium, in a conventional TEA $CO_2$ laser is dispensed with here, the operational cost of this laser is considerably reduced.

What is claimed is:

1. A helium-free TEA $CO_2$ laser comprising:

a pulser, a laser head comprising a pair of electrodes;

a gaseous medium comprising a mixture of $CO_2$, $N_2$ and, optionally, $H_2$, adapted to be pre-conditioned/pre-ionised in the inter-electrode volume by a suitable means;

wherein said pulser comprises an excitation circuit comprising (i) means to isolate spiker and sustainer pulses; and (ii) means to delay the spiker pulse with respect to the pre-ionising pulse, and wherein said means to isolate the spiker and sustainer pulses and said means to delay the spiker pulses with respect to the preionising pulse, comprise a wire wound inductance connected between ground and the corresponding electrode.

2. A helium-free TEA $CO_2$ laser according to claim 1 wherein said excitation circuit comprises single switch and single high voltage d-c source.

3. A helium-free TEA $CO_2$ laser according to claim 1, comprising means to vary the peak power, duration and energy of laser pulse.

4. A helium-free TEA $CO_2$ laser according to claim 3 wherein, said means to vary the peak power, duration and energy of the laser pulse comprises means to vary the partial pressure of $CO_2$ in the gaseous lasing medium of $N_2$ and $CO_2$ from 10% to 90% of the total pressure.

5. A helium-free TEA $CO_2$ laser according to claim 4 wherein said means to vary the partial pressure of $CO_2$ comprises suitable valve means.

6. A helium-free TEA $CO_2$ laser according to claim 1, wherein said pair of electrodes is selected from profiled, cylindrical, or unprofiled electrodes with rounded off edges.

7. A helium-free TEA $CO_2$ laser according to claim 1 wherein said suitable means for preionising the said gas mixture in the inter-electrode volume comprises sparks produced between a plurality of pairs of preionising cylindrical metallic pins, positioned along the length of the said electrodes, one above the other with a uniform gap and located at an optimum distance on either or any one side of the said electrodes at regular intervals.

8. A helium-free TEA $CO_2$ laser according to claim 1 wherein one of said pair of electrodes is semi transparent.

9. A helium-free TEA $CO_2$ laser according to claim 8 wherein means for preionising the said gas mixture in the inter-electrode volume comprises sparks produced between the semi-transparent electrode and a plurality of uniformly spaced preionising cylindrical metallic pins, positioned beneath and along the length of the said semi-transparent electrode.

10. A helium-free TEA $CO_2$ laser according to claim 1 wherein the said inter-electrode volume is selected from a 1 $cm^3$ to 200 $cm^3$ volume range.

11. A helium-free TEA $CO_2$ laser according to claim 1 wherein the operating efficiency on $TEM_{00}$ mode is about 5.2% for the Ernst profiled system.

* * * * *